United States Patent
Goyal et al.

(10) Patent No.: US 10,783,262 B2
(45) Date of Patent: Sep. 22, 2020

(54) TAGGING DOCUMENTS WITH SECURITY POLICIES

(71) Applicant: ADOBE INC., San Jose, CA (US)

(72) Inventors: Tanya Goyal, Chandigarh (IN); Sanket Vaibhav Mehta, Karnataka (IN); Balaji Vasan Srinivasan, Kaikondrahalli (IN); Ankur Jain, Noida (IN)

(73) Assignee: ADOBE INC., San Jose, CA (US)

( * ) Notice: Subject to any disclaimer, the term of this patent is extended or adjusted under 35 U.S.C. 154(b) by 171 days.

(21) Appl. No.: 15/424,527

(22) Filed: Feb. 3, 2017

(65) Prior Publication Data

US 2018/0225471 A1 Aug. 9, 2018

(51) Int. Cl.
*G06F 21/62* (2013.01)
*G06F 16/35* (2019.01)

(52) U.S. Cl.
CPC .......... *G06F 21/6209* (2013.01); *G06F 21/62* (2013.01); *G06F 21/6218* (2013.01); *G06F 16/35* (2019.01); *G06F 16/355* (2019.01)

(58) Field of Classification Search
CPC .......... G06F 21/10; G06F 21/00; G06F 21/60; G06F 21/6209; G06F 21/62–629; G06F 16/35–355
See application file for complete search history.

(56) References Cited

U.S. PATENT DOCUMENTS

| | | | | |
|---|---|---|---|---|
| 6,253,169 B1 * | 6/2001 | Apte | .............. | G06F 16/355 704/9 |
| 7,095,854 B1 * | 8/2006 | Ginter | .............. | G06F 21/10 380/231 |
| 8,751,424 B1 * | 6/2014 | Wojcik | .............. | G06F 21/554 706/20 |
| 9,069,798 B2 * | 6/2015 | Hershey | .............. | G06F 16/20 |
| 2006/0218169 A1 * | 9/2006 | Steinberg | .............. | G06F 16/285 |
| 2008/0059448 A1 * | 3/2008 | Chang | .............. | G06F 16/353 |
| 2014/0201111 A1 * | 7/2014 | Kasravi | .............. | G06F 16/35 706/12 |
| 2014/0274748 A1 * | 9/2014 | Ahlquist | .............. | C12Q 1/6886 506/7 |
| 2014/0337272 A1 * | 11/2014 | Cox | .............. | G06F 16/00 706/47 |
| 2016/0217276 A1 * | 7/2016 | Choi | .............. | G06F 21/16 |

(Continued)

OTHER PUBLICATIONS

Bell, Jason, Machine Learning—Hands-On for Developers and Technical Professionals, Nov. 3, 2014, Wiley, pp. 45-68, 139-160, & 223-274 (Year: 2014).*

(Continued)

*Primary Examiner* — Daniel B Potratz
*Assistant Examiner* — D'Arcy Winston Straub
(74) *Attorney, Agent, or Firm* — Shook, Hardy & Bacon L.L.P.

(57) ABSTRACT

Embodiments of the present invention provide systems, methods, and computer storage media directed to facilitate identification of security policies for documents. In one embodiment, content features are identified from a set of documents having assigned security policies. The content features and corresponding security policies are analyzed to generate a security policy prediction model. Such a security policy prediction model can then be used to identify a security policy relevant to a document.

18 Claims, 6 Drawing Sheets

(56) References Cited

U.S. PATENT DOCUMENTS

2016/0292445 A1* 10/2016 Lindemann .......... G06F 16/353

OTHER PUBLICATIONS

Agrawal, R., Gupta, A., Prabhu, Y., & Varma, M. (May 2013). Multi-label learning with millions of labels: Recommending advertiser bid phrases for web pages. In Proceedings of the 22nd international conference on World Wide Web (pp. 13-24). ACM.

Aura, T., Kuhn, T. A., & Roe, M. (Oct. 2006). Scanning electronic documents for personally identifiable information. In Proceedings of the 5th ACM workshop on Privacy in electronic society (pp. 41-50). ACM.

Cumby, C. M., & Ghani, R. (Aug. 2011). A Machine Learning Based System for Semi-Automatically Redacting Documents. In IAAI.

Finkel, J. R., Grenager, T., & Manning, C. (Jun. 2005). Incorporating non-local information into information extraction systems by gibbs sampling. In Proceedings of the 43rd annual meeting on association for computational linguistics (pp. 363-370). Association for Computational Linguistics.

Sánchez, D., Batet, M., & Viejo, A. (Nov. 2012). Detecting sensitive information from textual documents: an information-theoretic approach. In International Conference on Modeling Decisions for Artificial Intelligence (pp. 173-184). Springer, Berlin, Heidelberg.

Tsoumakas, G., & Vlahavas, I. (Sep. 2007). Random k-labelsets: An ensemble method for multilabel classification. In European conference on machine learning (pp. 406-417). Springer, Berlin, Heidelberg.

* cited by examiner

TAGGING DOCUMENTS WITH SECURITY POLICIES

BACKGROUND

Security policies are oftentimes applied to documents to prevent unauthorized users from accessing or otherwise using the document. For example, a document may include confidential or sensitive information and deemed appropriate for only a particular set of authorized users. As such, the document may include a security policy that enables the set of authorized users to access the documents, while individuals that are not authorized users are not permitted to access the document. Generally, such security policies are manually created by the document author or an administrator. Manually creating security policies for documents can be time consuming and inconsistent. In particular, a user (e.g., author or administrator) needs to understand the document and contents therein to determine authorized users and corresponding permissions. Further, the user is required to manually designate such authorizations and permissions, which can be time consuming and even erroneous.

SUMMARY

Embodiments of the present invention relate to methods, systems, and computer readable media for facilitating identification of security policies, or portions thereof, that are relevant to a document. In this regard, a security policy can be automatically identified for a new document being created by a user and/or for an existing document previously assigned a security policy. For such new documents, a user may be presented with a suggested security policy, or portion thereof (e.g., authorizations and corresponding permission), of which the user can select or confirm to associate with a document. For existing documents, a user may be presented with a security policy, or portion thereof, of which the user might review to ensure the security policy is accurate. Further, in some cases, the user may be presented with modification suggestions that are recommended to modify the existing security policy.

As described herein, identifying security policies, or portions thereof, to recommend as relevant to a document can be automatically performed using a security policy prediction model. Such a security policy prediction model can be a hierarchical model that is based on an existing document data set including assigned security policies and content features extracted from the documents. Utilizing the assigned security policies and corresponding content features, a model can be learned for subsequent use in predicting security policies relevant to documents.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

The present invention is described in detail below with reference to the attached drawing figures, wherein.

DETAILED DESCRIPTION

Figure 1:
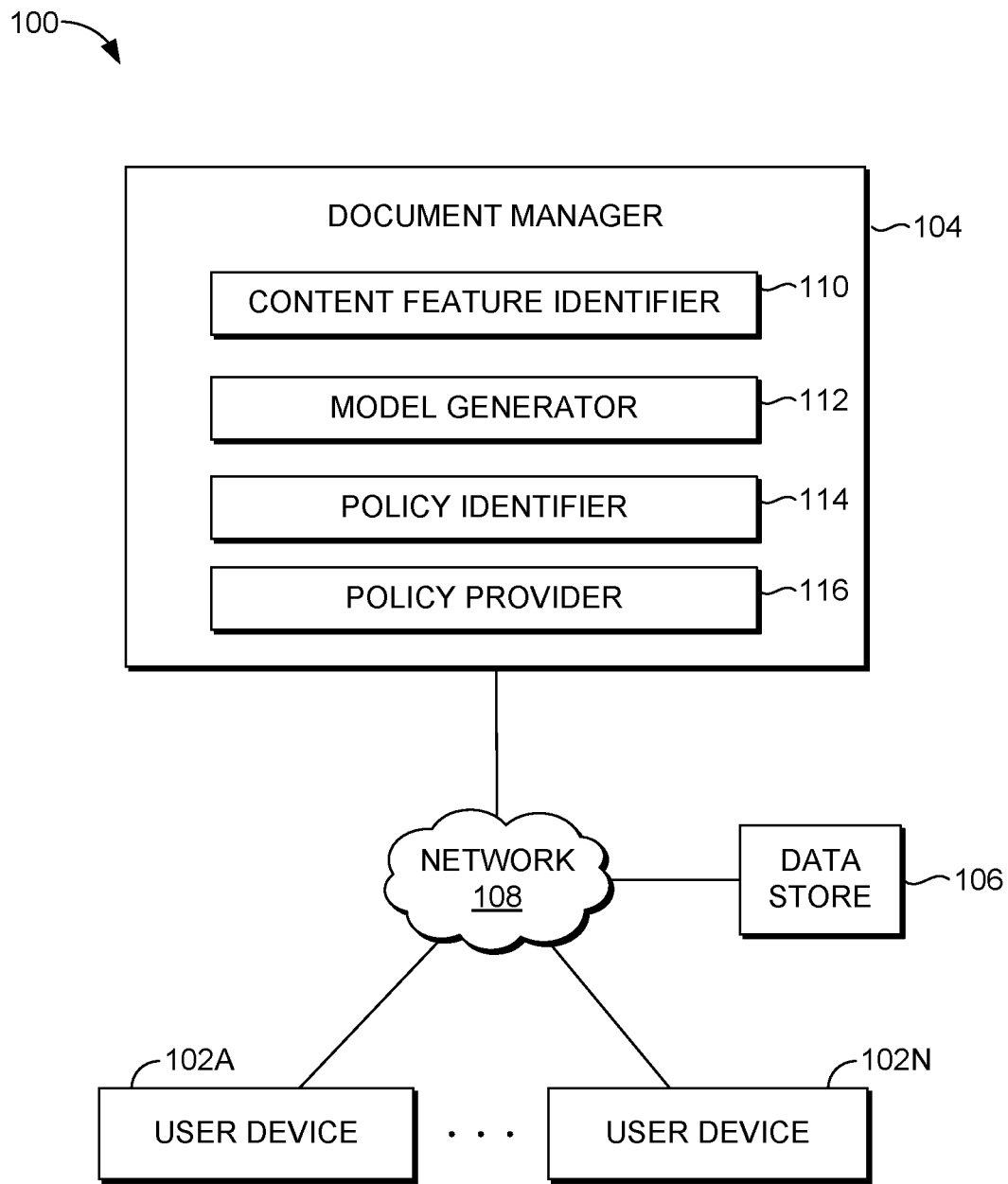
FIG. 1 is a schematic depiction of a system for facilitating security policy identification, in accordance with embodiments of the present invention.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Digital documents are frequently shared or exchanged among various users. Oftentimes, the digital documents contain sensitive information. Because the digital documents contain sensitive information, security policies are generally applied to the documents to protect against unauthorized document access. Currently, security policies are typically manually applied by administrators to enable document protection. Manually assigning security policies to documents can be time consuming, in particular, in larger entities that share or distribute an extensive amount of documents as manually applying security policies does not scale as document volume increases. While some existing technologies automate policy assignments, such policy assignments are rule-based thereby limiting scalability.

Accordingly, embodiments of the present invention relate to methods, systems, and computer readable media for automatically identifying a security policy(s) relevant or applicable to a particular document. In this regard, a document can be automatically tagged with a security policy(s) identified as relevant to the document. Automatically tagging security policies enables the application of security policies to scale as the number of documents increase. As described herein, security policies can be identified for new and/or existing documents. To this end, a new document can be analyzed and tagged with a security policy(s) that is identified as relevant to the document. Such a security policy(s) can be provided as a security policy suggestion to a user. Similarly, an existing document can be analyzed and tagged with a security policy(s) enabling identification as to whether the document may be adequately or inadequately protected via its previously assigned security policy. Further, in cases that a document may be determined to be inadequately protected via its previously assigned security policy, one or more security policy modification suggestions may be provided to a user.

To identify a security policy(s) that may be relevant to a document, various content features associated with the document can be identified, such as the document owner and document content. The content features can be compared to previously collected content features and corresponding security policies to identify a security policy relevant to the current document being analyzed. In this regard, documents can be automatically tagged with security policies learned from the historic access granted for other documents. Such security policy identification can enable automatic security policy suggestions for new or existing documents taking into account sensitive information in the document. Aspects of the invention are generally described as identifying security policies for electronic documents. Electronic documents, or documents, broadly refers to any electronic content, such as documents, web pages, etc.

Turning now to FIG. 1, a schematic depiction is provided illustrating an exemplary system 100 in which some embodiments of the present invention may be employed. Among other components not shown, the environment 100 may include user devices 102A-102N, document manager 104, and a data store 106. It should be understood that the system 100 shown in FIG. 1 is an example of one suitable computing system. Any of the components shown in FIG. 1 may be implemented via any type of computing device, such as computing device 600 described with reference to FIG. 6, for example. The components may communicate with each other via one or more networks 108, which may include, without limitation, one or more local area networks (LANs) and/or wide area networks (WANs). Such networking environments are commonplace in offices, enterprise-wide computer networks, intranets, and the Internet.

It should be understood that this and other arrangements described herein are set forth only as examples. Other arrangements and elements (e.g., machines, interfaces, functions, orders, groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

Generally, system 100 facilitates automatic identification of security policies for documents. A security policy generally refers to a policy used to protect a document from unauthorized access of the document, or to permit authorized access to the document. A security policy can include permissions settings and a set of authorized users corresponding to the permissions settings. A permissions setting indicates a manner in which a user can use or interact with the protected document. For example, a permission setting may indicate whether a user may access, print, copy, sign, and/or edit text in a protected document. As can be appreciated, a permission setting may be indicated in any number of ways. For example, a permission setting may indicate a security level (e.g., low, medium, high, 1, 5, etc.) that is associated with various uses of a protected document.

In operation, user devices 102A-102N (sometimes referred to herein as user devices 102 or user device 102) may access the document manager 104 and/or data store 106 over a network 108 (e.g., a LAN or the Internet). For instance, a user device 102 may provide and/or receive data from the document manager 104 via the network 108. Network 108 may include multiple networks, or a network of networks, but is shown in simple form so as not to obscure aspects of the present disclosure. By way of example, network 108 can include one or more wide area networks (WANs), one or more local area networks (LANs), one or more public networks, such as the Internet, and/or one or more private networks. Networking environments are commonplace in offices, enterprise-wide computer networks, intranets, and the Internet. Accordingly, network 108 is not described in significant detail.

A user device, such as user devices 102A-102N, may be any computing device that is capable of presenting content to a user, for example, via a web browser or application installed thereon. In particular, and in accordance with embodiments described herein, user device 102 presents document content to users. The user device 102 may be operated by a user or consumer that might view a document. The user device 102 may take on a variety of forms, such as a personal computer (PC), a laptop computer, a mobile phone, a tablet computer, a wearable computer, a personal digital assistant (PDA), an MP3 player, a global positioning system (GPS) device, a video player, a digital video recorder (DVR), a cable box, a set-top box, a handheld communications device, a smart phone, a smart watch, a workstation, any combination of these delineated devices, or any other suitable device. Further, the user device 102 may include one or more processors, and one or more computer-readable media. The computer-readable media may include computer-readable instructions executable by the one or more processors.

User devices 102A-102N may be used to create and/or view a document. In accordance with creating a new document, as described herein, embodiments of the present invention may be used to automatically identify a security policy relevant or applicable to the document. In some cases, one or more security policy suggestions may be provided to a user via the user device such that the user can select or confirm a security policy for the document.

Additionally or alternatively, user devices 102A-102N may be used to facilitate the collection of document data, such as document data collected at the data store 106. In this regard, a user may create a document via a user device, such as user device 102. Further, in some cases, a user may assign or designate a security policy applicable to the document. For instance, the user may select a group of authorized users and corresponding permission settings. The created document and corresponding security policy may be stored as document data, for example, at data store 106, such that document data can be subsequently accessed and analyzed to facilitate generation of a security policy prediction model, as described in more detail below. Additionally or alternatively, and as described more fully below, document data may be subsequently analyzed to identify adequacy of the existing security policy designated for the document.

The data store 106 includes data used to identify, select, or provide security policies or security policy suggestions. As described in more detail below, the data store 106 may include document data. Document data may include documents, or content associated therewith, corresponding security policies, and content features. As previously described, a security policy may include an indication of authorized users and corresponding permission settings. Such document data may be stored in the data store 106 and accessible to any component of the system 100, such as user devices 102A-102N and/or document manager 104. The data may also be updated at any time. In embodiments, the document data, or portion thereof, is updated dynamically or, in real-time, at any point when data changes.

The document manager 104 is generally configured to manage documents and, in particular, security policies associated with documents. A document manager may include a content feature identifier 110, a model generator 112, a policy identifier 114, and a policy provider 116. Although illustrated as separate components of the document manager 104, any number of components can be used to perform the functionality described herein. Further, although illustrated as being a part of a document manager, the components can be distributed via any number of devices. For example, the model generator 112 can be provided via one device, server, or cluster of servers, while the policy identifier 114 can be provided via another device, server, or cluster of servers. The components identified herein are merely set out as examples to simplify or clarify the discussion of functionality. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more components may be carried out by hardware, firmware, and/or software. For instance, various functions may be carried out by a processor executing instructions stored in memory.

The content feature identifier 110 is generally configured to identify content features associated with a document. Content features refer to any feature or attribute that indicates an aspect of content associated with a document. Such content features might be a word or phrase that describes, characterizes, or indicates an aspect of document content. Content features may include, for example, a document author, textual features, sensitivity features, or the like. A document author refers to an author or user that created or assisted in creating the document. A textual feature can be a textual description (e.g., word or keyword) used to represent or indicate a document or topic of the document. A sensitivity feature refers to a feature (e.g., text) that is indicative of personal or sensitive information in a document. Sensitivity features may include, without limitation, names of individuals and/or organizations, location, dates, currency or money references, phone numbers, addresses, social security numbers, email addresses, health or medical information, etc. The sensitive feature can refer to a category of sensitive information. For example, dimensions may be "name of organization," "name of individual," "social security number," "credit card number," etc. The dimensions may be incremented, for instance, each instance they appear in the document.

Content features can be collected, obtained, or identified in any manner. In some cases, content features are provided by an author or administrator associated with the document. In this regard, an author might enter or input data, for example, via a website accessible by way of a browser or an application on the user device 102. As an example, a user might enter or select textual features or sensitivity features via user device 102 that is connected to the network 108. For instance, a user might provide a list of important keywords for a document or select important keywords, for example, from a list of potential keywords extracted as described below.

Additionally or alternatively, content features can be derived or determined. In this regard, content associated with a document may be analyzed to detect content features. For example, a document can be analyzed to detect content features associated with the document. In some cases, natural language processing can be used to detect content features. For instance, content associated with a document can be passed through a text/content analysis engine, such as Semantria® Engine or any other NLP Engine (e.g., Natural Language Toolkit trained under domain/vertical specific ontology). Such a text/content analysis engine can be used to extract data, such as content features. By way of example only, features (e.g., keywords such as camera, display, battery, etc.) might be extracted from content associated with a document.

To detect or extract content features, various technologies may be employed based on the type of content feature being extracted. For instance, one technology may be implemented to identify or extract textual features, while another technology may be implemented to identify or extract sensitivity features. Methods used to extract textual features may include, for instance, term frequency, TFIDF, topic distribution, Doc2Vec, or the like. For example, content can be analyzed to identify term frequency of features. In some cases, the content may be passed through a term frequency tagger one or more times to determine such frequencies. For example, the document content may be passed through a term frequency tagger to determine the term frequency of every feature. If a feature has greater than 0 term frequency, it signifies that the feature is mentioned in the content. Further, a higher term frequency indicates a higher number of times it is mentioned in the content. Term frequency-inverse document frequency (TFIDF) refers to a numerical statistic that is intended to reflect how important a word is to a document in a collection or corpus.

Methods used to extract or identify sensitivity features may include, for example, Stanford Named Entity Tagger, a rule-based regular expression, and/or the like. In one embodiment, a combination of an entity tagger and a rule-based regular expression can be used to extract sensitivity features.

Any number of methods can be used to identify or collect content features. The above methods are only provided as examples of possible implementations that may be employed in accordance with embodiments of the present invention.

Further, as can be appreciated, any number of content features may be obtained. In some cases, content features deemed relevant or beyond a threshold of relevancy might be selected, for example, such as most valuable or important content features (e.g., most relevant textual features and most relevant sensitivity features). In this regard, to filter out irrelevant or noisy features, for example, an information gain measure can be used to identify the most or greatest informative features. In such a case, a threshold, such as a top percent of all features, may be identified, selected, or retained.

Generally, information gain refers to a measure of the amount of information (e.g., in bits) obtained for permission prediction by knowing the presence or absence of a feature. Information gain of a feature f can be defined as:

$$IG(f) = \sum_{l \in L} \sum_{f' \in \{f, \bar{f}\}} P(f', l) \cdot \log \frac{P(f', l)}{P(f')P(l)} \quad \text{(Equation 1)}$$

where l denotes labels in the label set and f denotes the content features. As used herein, a label or policy label represents a user group-permission tuple. In this regard, a label or policy label can be a component or aspect of a security policy. A user group may include any number of users associated with a permission setting or set of permission settings. As can be appreciated, a security policy may include any number of labels, or user group-permission tuples. As shown, Equation 1 includes an estimation of conditional probabilities of a category given a term and entropy computations as in the definition. To this end, this computation estimates the importance of each feature towards the prediction of labels, that is user group-permission tuples, and uses such estimates to identify top features. In some cases, a predetermined set of features is retained, such as k % of features with the highest information gain. As can be appreciated, k % can be empirically determined.

Identifying and/or selecting content features might occur at any time. For instance, in some cases, content features associated with a document might be obtained on a single occasion, on a periodic basis, or as content is obtained. The set of identified content features, or the selected content features, can be stored for subsequent use. For example, content features can be stored in association with the data store 106 for subsequent use in generating a security policy prediction model.

The model generator 112 is generally configured to generate a security policy prediction model(s). A security policy prediction model generally refers to a model that is generated to predict a security policy(s) relevant to a document. Model generator 112 may utilize any approach to generate a security policy prediction model. As one example, model generator 112 may use a multi-class approach in which each document is tagged with a single policy. In such an approach, a model can be trained for every policy. For a new document, a policy can be identified as relevant, or suggested, based on the confidence of the model prediction.

Another approach to generate a security policy prediction model uses a multi-label classification that maintains each user group as a separate label. As such, each user group-permission tuple can represent a potential label in association with a document. This approach may enable assignment of permissions at a finer granularity.

In one implementation using multi-label classification, a security policy prediction model may be generated by learning a hierarchy over a feature space via recursive partitioning of a parent node's feature space between the corresponding children. Such partitioning may be performed based on optimization of a ranking loss function (e.g., normalized discounted cumulative gain (nDCG)). In particular, the model generator 112 can reference document data input as training data. Such document data input may include a set of content features (denoted herein as xi) and corresponding labels (denoted herein as yi) associated with a document. The document data can be used to learn a tree hierarchy over the feature space based on the labels (user group-permission tuples). Such content features, xi, may include the textual features and sensitivity features identified and/or selected via the content feature identifier 110 (e.g., textual and sensitivity features extracted and pruned based on corresponding information gains). The label, Yi, refers to the set of all labels, or user group-permission tuples, associated with a security policy for a document. At each node of the tree, a linear separator w is learned. The linear separator w is used to divide the feature space associated with the node into a positive and negative partition by minimizing a ranking loss function defined as:

$$\min\|w\|_1 + \sum_i \log(1 + e^{-\delta_i w^T x_i}) - \sum_i (1+\delta_i) LnDCG(r^+, y_i) - \sum_i (1-\delta_i) LnDCG(r^-, y_i) \quad \text{(Equation 2)}$$

where $w \approx R^D$, $\delta_i \in \{-1, +1\}$, $r^+, r^-$ is a ranked list of labels in the positive and negative partition, respectively. Given a ranking of labels r and the ground truth label vector y, LnDCG(r,y) is defined as:

$$LnDCG(r, y) = \sum_{l=1}^{L} \frac{2y_{r_l} - 1}{\log(1 + l)} \quad \text{(Equation 3)}$$

where $y_{r_l}$ denotes the binary ground truth for the $l^{th}$ label according to ranking r. This ensures that positive labels predicted with higher ranks are rewarded while at the same time penalizing the negative labels predicted with higher ranks. Recursive partitioning may occur, for instance, until a maximum or threshold number of nodes is reached. In some cases, at the root of the tree, the labels may be randomly partitioned into two sets.

As can be appreciated, in identifying security policies, including user group-permission tuples or labels for a document, it may be valuable to reward for correctly predicting labels as well as penalizing for wrongly predicting labels as this means that an ineligible user has been given permission to sensitive information. Accordingly, the $(y_{r_l}-1)$ term above in Equation 3 introduces a $-1/\log(1+l)$ term for each wrongly predicted label, where l is the rank of the label in the ranked list r.

An exemplary algorithm used to optimize the tree is provided herein:

---
Algorithm 1: GrowTree
---
Require: {xi,yi}
1. $N_{root}$ <- new node
2. If no. of labels active in $N_{root}$ < MaxLeaf
3.    Create $N_{root}$ into a leaf node
4. Else
5.    Learn linear separator w that minimizes $\|w\|$ + logLoss − nDCG(r +) − nDCG(r−)
6.    $n^+ = \{x_i \mid w^T x_i > 0\}$
7.    $n^- = \{x_i \mid w^T x_i < 0\}$
8.    $N_{root}$ (linear_separator) = w
9.    $N_{root}$ (left_child) = GrowTree({xi,yi}$_{i \in n +}$)
10.   $N_{root}$ (right_child) = GrowTree({xi,yi}$_{i \in n -}$)
11. End if
12. Return($N_{root}$)

---

Upon generating a security policy prediction model, the security policy prediction model can be stored, for example in association with data store 106.

The policy identifier 114 is configured to identify security policies, or portions associated therewith, relevant to documents. In embodiments, the policy identifier 114 uses a security policy prediction model(s), such as a security policy prediction model(s) generated by the model generator 112 of FIG. 1, to identify security policy data (e.g., security policies, policy labels, modification suggestions) relevant to documents. To identify relevant security policy data for a document, the document is analyzed. In such a case, a document may be analyzed to identify content features associated with the document. As can be appreciated, content features may be identified, for instance, using content feature identifier 110. Accordingly, textual features and/or sensitivity features can be identified or extracted from the document for use in identifying a relevant security policy. In this regard, a representation x of the new document in the feature space can be determined.

In an implementation using a security policy prediction model as described herein, content features identified in association with the document can be used to predict or identify a security policy. In embodiments, analysis can begin at the root node of the model and traverse down the tree until a leaf node is reached. For traversal, at each node, a value of the term $w^T x$ is calculated, where w is the linear separator associated with that node. In this way, the classifier at the node is exercised on the feature space, and the resulting classification score is used for further traversal. Because the linear separator at each node divides the feature space into two portions, depending on the sign (positive or negative) of $w^T x$, the document d is passed down to the left child node if $w^T x$ is less than zero and to the right child node if $w^T x$ is greater than zero. The tree can be traversed in this manner until a leaf node is reached.

Each leaf node includes a subset of points from the training data. As such, the policy identifier 114 can return labels associated with the leaf node, such as the top k ranked labels given by:

$$r(x) = \text{rank}\left(\sum_{i \in S^{leaf}(x)} y_i\right) \quad \text{(Equation 4)}$$

where $S^{leaf}(x)$ are the set of points in the leaf node that x reaches. An exemplary algorithm that can be used is provided herein:

---
Algorithm 2 Predict
---
Require: x = Representation of document d in the feature space
1.  n <- $N_{root}$ of FastXML Tree
2.  while n is not leaf node
3.     w = n(linear_separator)
4.     If $w^T x > 0$
5.       n <- n(left_child)
6.     Else
7.       n <- n(right_child)
8.  End while
9.  Return ranked list of labels at node n
---

As described, using a security policy prediction model, the policy identifier 114 can identify a set of potential policy labels. In some cases, the policy identifier 114 identifies a ranked list of labels. In such a case, a portion of the labels can be selected. For instance, the top k labels, or user group-permission tuples, can be selected. Such identified labels, or portion thereof, can be used to automatically tag or associate with the corresponding document. The identified labels can be provided as label suggestions, or a security policy suggestion, to a user to be applied to a current document. In this regard, a set of labels, or user group-permission tuples, can be selected for providing to a user as label suggestions for a security policy. Alternatively or additionally, a security policy including the selected set of labels can be provided as a security policy suggestion. Because the implementations described herein are directed to reducing manual effort required to tag documents with policies, in some cases, nearly all relevant identified labels are provided to a user.

To review existing security policies associated with documents, the policy identifier 114 can treat each existing document as a new document and follow the analysis described above. As such, using a security policy prediction model, a set of labels (e.g., ranked set of labels) can be identified in association with the documents. In some cases, a top k of labels may be selected from the identified labels. As this may discern lenient or inadequate policies, the value of k may be chosen such that it allows for high precision. Such identified labels, or portion thereof, can be used to automatically tag or associate with the corresponding document. The identified labels can be provided as policy label suggestions, or a security policy suggestion, to a user to be applied to the existing document.

In some cases, the identified labels, or portion thereof, can be compared against the existing policy assigned to the document. Based on the comparison, users or user groups that are assigned permissions in the existing policy but not in the suggested policy can be identified and marked for review. Further, users or user groups that have been assigned a relatively lenient permission in the existing policy as compared to a suggested policy, or labels associated therewith, can be identified and marked for review. Accordingly, upon comparing identified labels against the existing policy assigned to a document, the policy identifier 114 may determine security policy modification suggestions that suggest or recommend modifications that can be applied to an existing security policy.

Although any number of approaches may be used to generate security policy prediction models, utilization of a tree can provide an efficient approach. For example, methods that depend on training independent models for each label/label set may not perform as well in cases with very few training examples. Further, as other approaches train multiple models, one for each label/label set, while assigning a policy to a new document, the document is generally evaluated against all such models which can result in considerable prediction cost. In the approach generally described herein, the document simply traverses down a tree with minimal computation at each node.

Upon identifying one or more labels relevant to a document, such as a new document or an existing document, the policy provider 116 can provide such identified policy labels, or a portion thereof, to a user device for presentation to a user. In this regard, the policy provider 116 might provide a set of labels for review and selection by a user to incorporate into a security policy. Alternatively or additionally, the policy provider 116 might provide a set of labels as a security policy suggestion for selection or confirmation by a user. In cases that security policy modifications are suggested, such modification suggestions may be provided to a user device for presentation to the user. The user, via a user device, can the select a final set of labels, or a security policy, to be applied to the document.

Figure 2:
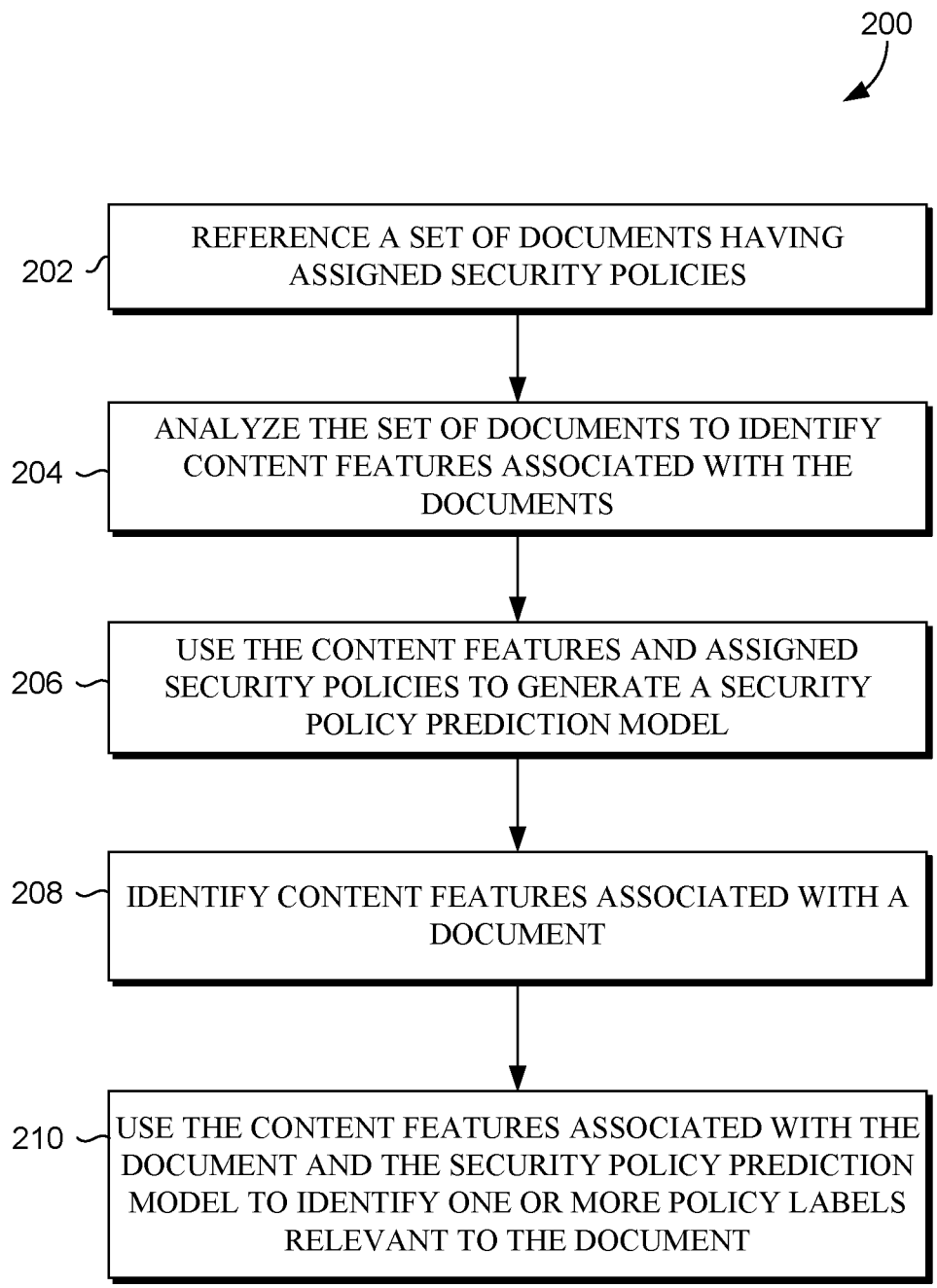
FIG. 2 is a flow diagram showing a method for facilitating identifying security policies for documents, in accordance with an embodiment of the present invention.

Turning now to FIG. 2, a flow chart is illustrated showing an exemplary method 200 of facilitating identifying security policies for documents. In embodiments, the method 200 is performed by a document manager, such as document manager 104 of FIG. 1. Initially, and as indicated at block 202, a set of documents having assigned security policies are referenced. At block 204, the set of documents are analyzed to identify content features associated with the documents. Content features can be, for instance, textual features and sensitivity features. Various types of technology can be implemented to identify or extract content features. At block 206, the content features and assigned security policies are used to generate a security policy prediction model. Thereafter, at block 208, content features associated with a document are identified. For instance, textual features and sensitivity features can be identified in association with the content of the document. At block 210, the content features associated with the document and the security policy prediction model are used to identify one or more policy labels relevant to the document. In some cases, the policy labels, or a portion thereof, can be provided to a user as policy label suggestions. A user can then select specific policy label suggestions to be included in a security policy for the document. In other cases, the policy labels can be compared to a security policy previously assigned to the document to identify any security policy modifications to suggest to the user. A user can then select modifications to apply to the security policy previously assigned to the document.

Figure 3:
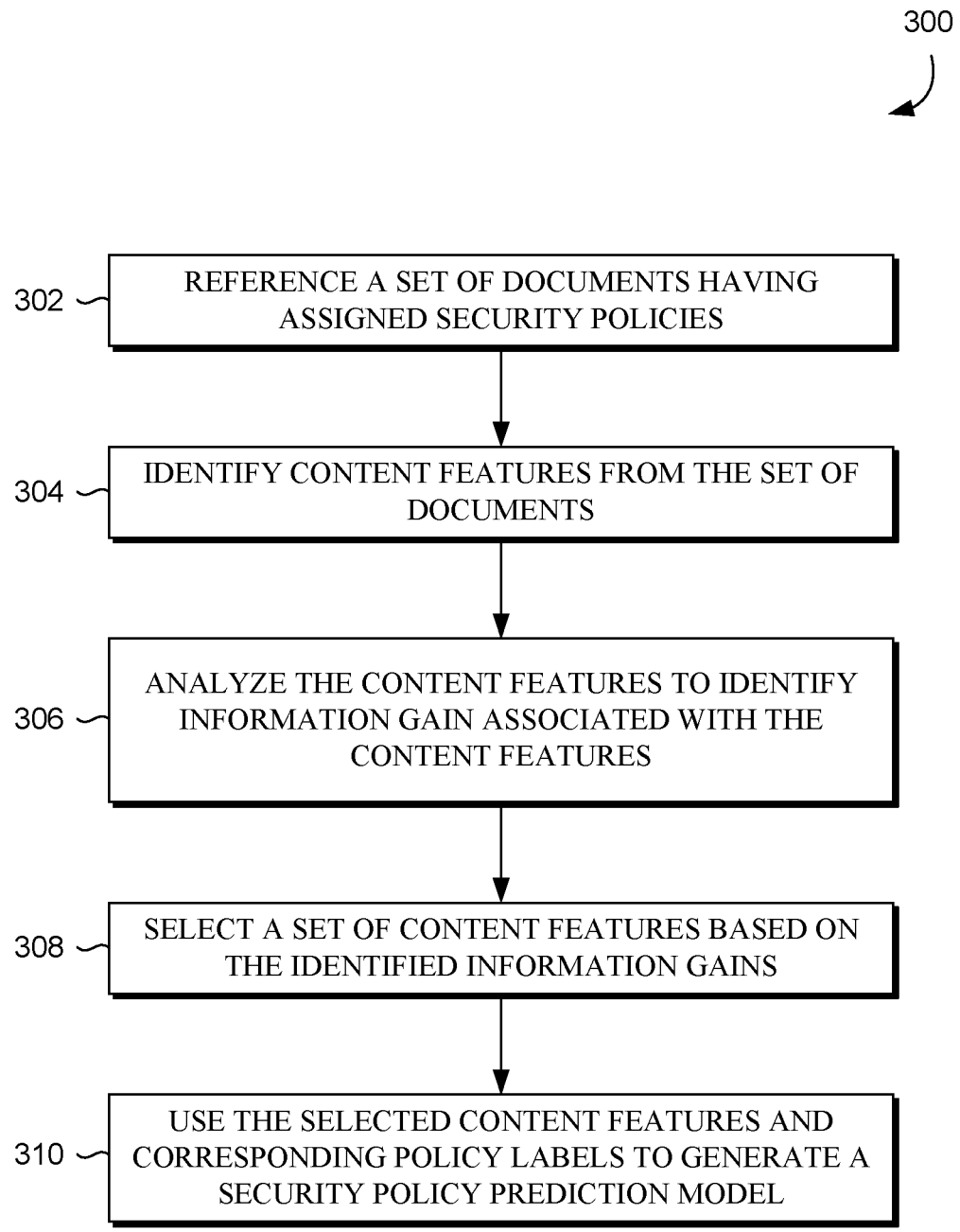
FIG. 3 is a flow diagram showing a method for generating a security policy prediction model, in accordance with an embodiment of the present invention.

Referring now to FIG. 3, a flow diagram shows a method 300 for generating a security policy prediction model, in accordance with embodiments of the present invention. In embodiments, the method 300 is performed by a document manager, such as document manager 104 of FIG. 1. Initially, at block 302, a set of documents having assigned security policies are referenced. At block 304, content features are identified or extracted from the set of documents. Such content features may include textual features and/or sensitivity features. At block 306, the content features are analyzed to identify information gain associated with the content features. Information gain generally estimates the importance of the content features towards the prediction of policy labels. Subsequently, at block 308, a set of content features are selected based on the identified information gains. For example, a top percent or portion of content features with a highest information gain may be selected. At block 310, the selected content features and corresponding policy labels are used to generate a security policy prediction model. In embodiments, the security policy prediction model is a hierarchical tree model. In this regard, a hierarchical tree model can be learned over the selected content features by recursively partitioning a parent node of the selected content features. The content features can be recursively partitioned, for example, until a maximum number of nodes is reached or obtained.

Figure 4:
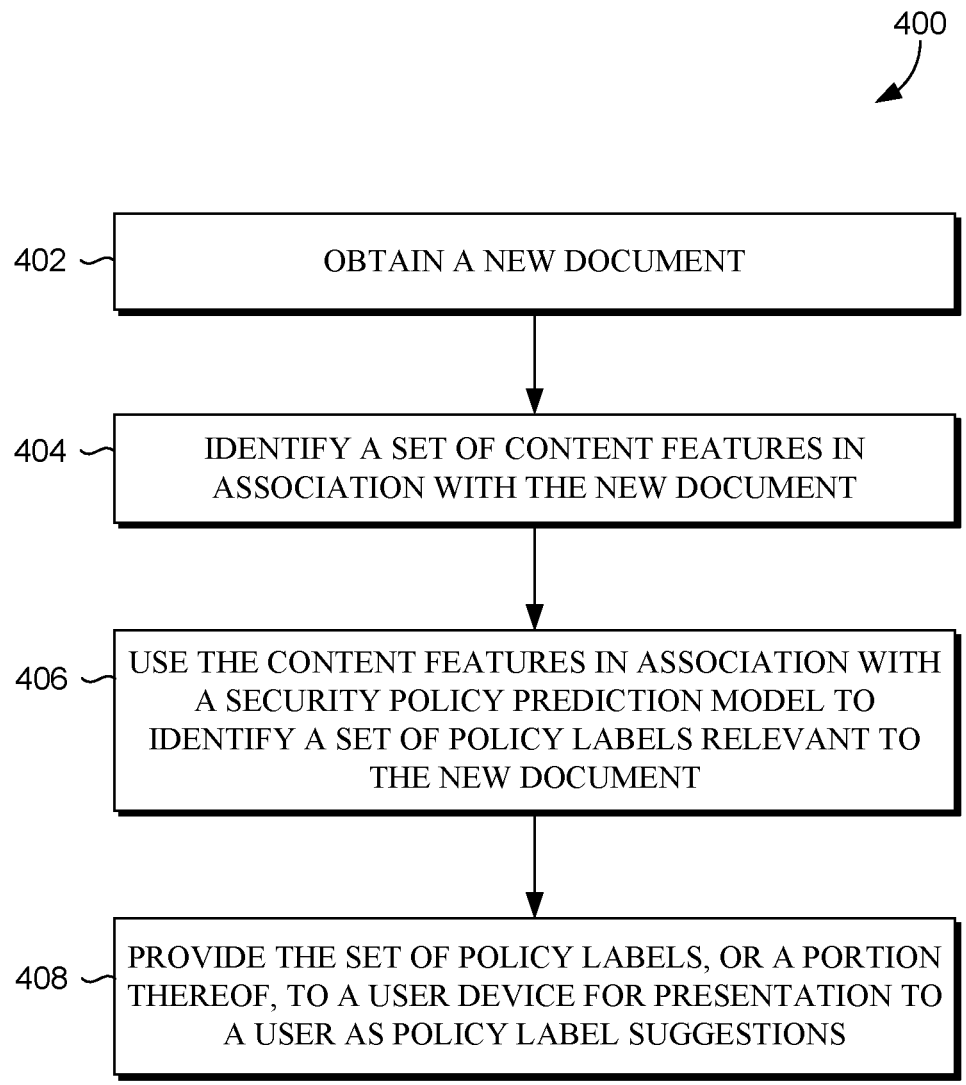
FIG. 4 is a flow diagram showing a method for facilitating identifying security policies for new documents, in accordance with an embodiment of the present invention.

With reference now to FIG. 4, a flow diagram shows a method 400 for facilitating identifying security policies for documents, in accordance with embodiments of the present invention. In embodiments, the method 400 is performed by a document manager, such as document manager 104 of FIG. 1. Initially, at block 402, a new document is obtained. At block 404, a set of content features are identified in association with the new document. At block 406, the content features are used in association with a security policy prediction model to identify a set of policy labels relevant to the new document. The set of policy labels can include a set of authorized users and corresponding permission settings. At block 408, the set of policy labels, or a portion thereof, are provided to a user device for presentation to a user as policy label suggestions. A user can then select which policy label suggestions are desired for inclusion of a security policy for the new document. Selection of policy label suggestions may occur in any manner, such as, for instance, by selecting particular policy labels or deselecting particular policy labels. As can be appreciated, in some cases, the identified set of policy labels can be automatically applied to the new document (e.g., without user selection).

Figure 5:
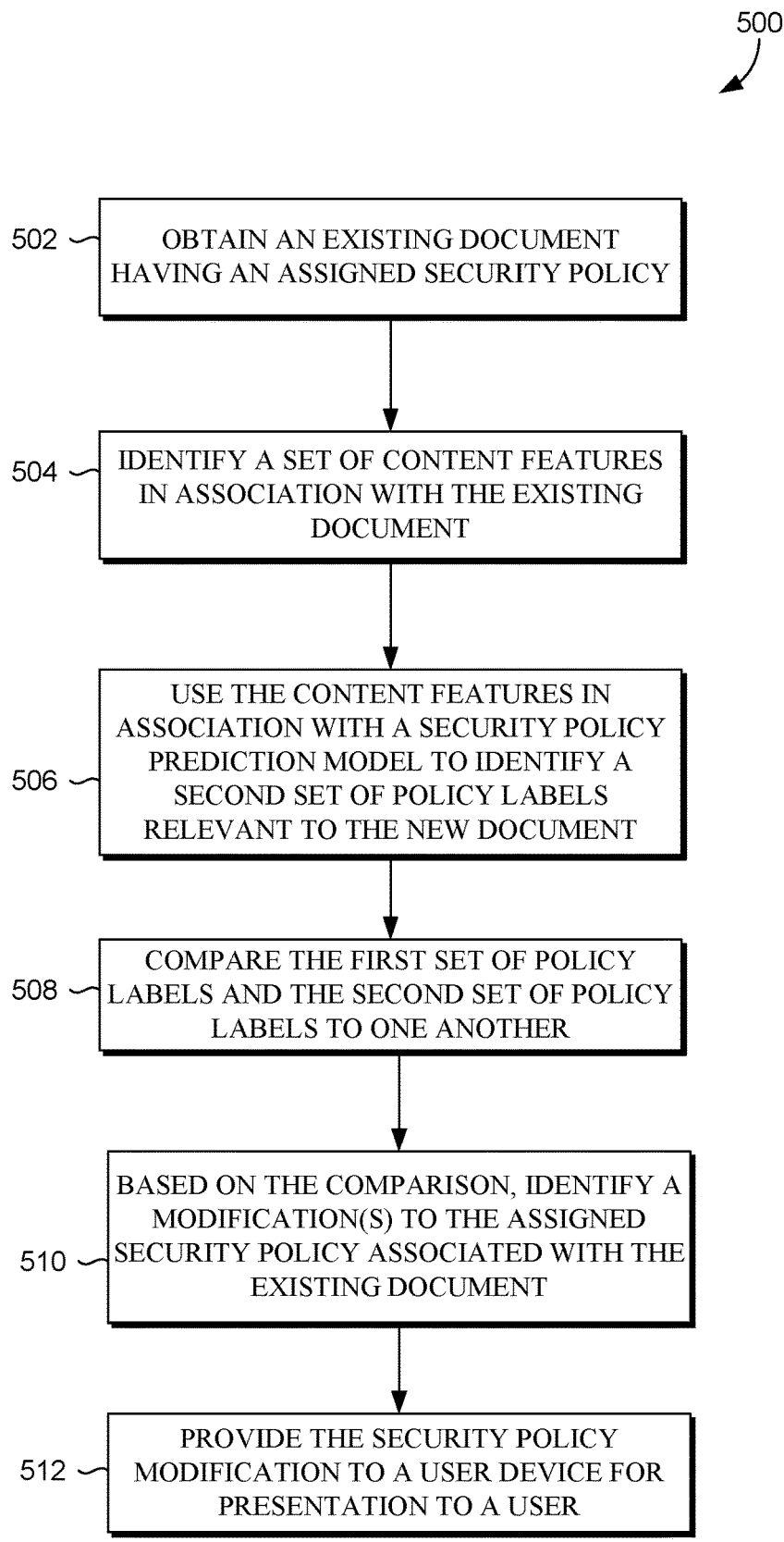
FIG. 5 is a flow diagram showing a method for facilitating identifying security policies for existing documents, in accordance with an embodiment of the present invention.

With reference now to FIG. 5, a flow diagram shows a method 500 for facilitating identifying security policies for documents, in accordance with embodiments of the present invention. In embodiments, the method 500 is performed by a document manager, such as document manager 104 of FIG. 1. Initially, at block 502, an existing document having an assigned security policy is obtained. In embodiments, the security policy includes a first set of policy labels indicating authorized users and corresponding permission settings. At block 504, a set of content features are identified in association with the existing document. At block 506, the content features are used in association with a security policy prediction model to identify a second set of policy labels relevant to the new document. The second set of policy labels can indicate authorized users and corresponding permission settings. At block 508, the first set of policy labels and the second set of policy labels are compared to one another. Based on the comparison, a modification(s) to the assigned security policy associated with the existing document can be identified, as indicated at block 510. At block 512, the security policy modification can be provided to a user device for presentation to a user. A user can then select whether the user desires to modify the security policy for the existing document in accordance with the security policy modification(s). As can be appreciated, in some cases, the identified security policy modification can be automatically applied to the existing document (e.g., without user selection).

Figure 6:
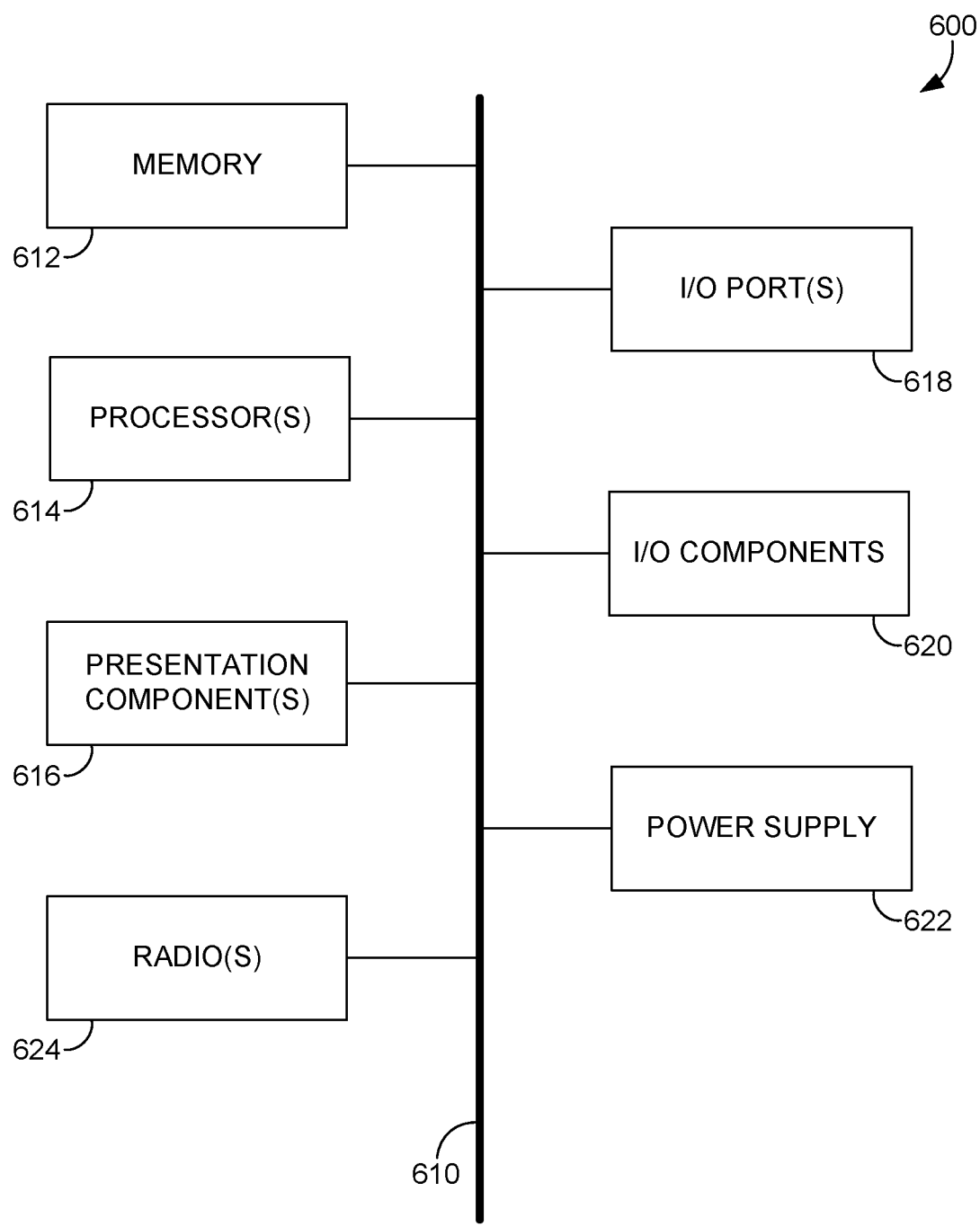
FIG. 6 is a block diagram of an exemplary computing environment suitable for use in implementing embodiments of the present invention.

Having described embodiments of the present invention, an exemplary operating environment in which embodiments of the present invention may be implemented is described below in order to provide a general context for various aspects of the present invention. Referring initially to FIG. 6 in particular, an exemplary operating environment for implementing embodiments of the present invention is shown and designated generally as computing device 600. Computing device 600 is but one example of a suitable computing environment and is not intended to suggest any limitation as to the scope of use or functionality of the invention. Neither should the computing device 600 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 6, computing device 600 includes a bus 610 that directly or indirectly couples the following devices: memory 612, one or more processors 614, one or more presentation components 616, input/output (I/O) ports 618, input/output components 620, an illustrative power supply 622, and one or more radios 624. Bus 610 represents what may be one or more busses (such as an address bus, data bus, or combination thereof). Although the various blocks of FIG. 6 are shown with lines for the sake of clarity, in reality, delineating various components is not so clear, and metaphorically, the lines would go accurately be grey and fuzzy. For example, one may consider a presentation component such as a display device to be an I/O component.

Also, processors have memory. The inventor recognizes that such is the nature of the art, and reiterates that the diagram of FIG. 6 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 6 and reference to "computing device."

Computing device 600 typically includes a variety of computer-readable media. Computer-readable media can be any available media that can be accessed by computing device 600 and includes both volatile and nonvolatile media, and removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 600. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 612 includes computer-storage media in the form of volatile and/or nonvolatile memory. The memory may be removable, non-removable, or a combination thereof. Exemplary hardware devices include solid-state memory, hard drives, optical-disc drives, etc. Computing device 600 includes one or more processors that read data from various entities such as memory 612 or I/O components 620. Presentation component(s) 616 present data indications to a user or other device. Exemplary presentation components include a display device, speaker, printing component, vibrating component, etc.

I/O ports 618 allow computing device 600 to be logically coupled to other devices including I/O components 620, some of which may be built in. Illustrative components include a microphone, joystick, game pad, satellite dish, scanner, printer, wireless device (e.g. radio(s) 624), etc. The I/O components 620 may provide a natural user interface (NU1) that processes air gestures, voice, or other physiological inputs generated by a user. In some instances, inputs may be transmitted to an appropriate network element for further processing. An NU1 may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 600. The computing device 600 may be equipped with depth cameras, such as stereoscopic camera systems, infrared camera systems, RGB camera systems, touchscreen technology, and combinations of these, for gesture detection and recognition. Additionally, the computing device 600 may be equipped with accelerometers or gyroscopes that enable detection of motion. The output of the accelerometers or gyroscopes may be provided to the display of the computing device 600 to render immersive augmented reality or virtual reality.

The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. A computer system comprising:
   a model generating means comprising one or more hardware processors and memory storing computer program instructions executable by the one or more hardware processors to generate a security policy prediction model based on a first set of content features and security policies associated with a set of documents, the security policy prediction model comprising a hierarchical tree model comprising a plurality of linear classifiers, wherein each leaf node of the hierarchical tree model is associated with a subset of policy labels that represent corresponding user group-permission tuples and form a corresponding one of the security policies, and wherein generating the security policy prediction model comprises selecting the first set of content features as a set of most informative features based on a threshold information gain being exceeded, wherein the threshold information gain is a function of the user-group permission tuples and quantifies a relevance of a given content feature of the first set of content features to all of the security policies; and
   a policy identification means comprising the one or more hardware processors and the memory storing computer program instructions executable by the one or more hardware processors to:
   utilize a second set of content features associated with a document and the security policy prediction model to predict a security policy, from the security policies, by passing the document through the plurality of linear classifiers to arrive at a leaf node associated with the security policy,
   selecting the security policy from the security policies based on arriving at the leaf node associated with the security policy; and
   performing at least one of (i) automatically tagging the document with the security policy, (ii) providing the security policy as a suggested security policy for the document, or (iii) providing a security policy modification recommendation based on security policy.

2. The system of claim 1, further comprising a feature identifying means comprising the one or more hardware processors and the memory storing computer program instructions executable by the one or more hardware processors to:
    identify the first set of content features associated with the set of documents based on an estimate of importance of the first set of content features towards all of the security policies; and
    identify the second set of content features associated with the document based on the estimate.

3. The system of claim 1, wherein the first and second sets of content features comprise textual features indicating content and sensitivity features indicating sensitive information.

4. The system of claim 1, wherein the model generating means is configured to generate the security policy prediction model by learning a linear classifier at each node of the hierarchical tree model, wherein each linear classifier of the plurality of linear classifiers is configured to divide a feature space associated with the first set of content features into positive and negative partitions.

5. The system of claim 1, wherein the document comprises a new document created by a user without a previously assigned security policy.

6. The system of claim 1, wherein the document comprises an existing document previously created, the existing document having an assigned first security policy.

7. The system of claim 6, wherein the policy identification means is further configured to compare the security policy predicted for the document to the first security policy and provide the security policy modification recommendations based on the comparison.

8. One or more non-transitory computer storage media storing computer-useable instructions that, when used by one or more computing devices, cause the one or more computing devices to perform operations to facilitate identification of security policies for documents, the operations comprising:
    identifying content features that indicate content of a set of documents previously assigned security policies, the previously assigned security policies including a set of authorized users and corresponding permission settings;
    generating a security policy prediction model configured to predict a set of predicted security policies for documents using a hierarchical tree model with a linear classifier at each node, wherein each leaf node of the hierarchical tree model is associated with a subset of policy labels that represent corresponding user group-permission tuples and form a corresponding one of the security policies, the security policy prediction model generated using the previously assigned security policies and the content features indicating content of the set of documents and wherein generating the security policy prediction model comprises selecting the first set of content features as a set of most informative features based on a threshold information gain being exceeded, wherein the threshold information gain is a function of the user-group permission tuples and quantifies a relevance of a given content feature of the first set of content features to all of the security policies;
    selecting a security policy for the document, from the security policies, based on passing the document through the hierarchical tree model to arrive at a leaf node associated with the security policy; and
    performing at least one of (i) automatically tagging the document with the security policy, (ii) providing the security policy as a suggested security policy for the document, or (iii) providing a security policy modification recommendation based on security policy.

9. The one or more non-transitory computer storage media of claim 8, wherein the content features comprise textual features that indicate content and sensitivity features that indicate sensitive information.

10. The one or more non-transitory computer storage media of claim 8, the operations further comprising comparing the predicted security policies with the previously assigned security policies and, based on the comparing, providing a suggestion to modify one or more of the previously assigned security policies.

11. The one or more non-transitory computer storage media of claim 8, the operations further comprising learning the hierarchical tree model over the feature space based on recursive partitioning of a feature space of a parent node of the hierarchical tree model.

12. The one or more non-transitory computer storage media of claim 11, the operations further comprising performing the recursive partitioning in accordance with optimization of a ranking loss function that rewards correct prediction and penalizes incorrect predictions.

13. One or more non-transitory computer storage media storing computer-useable instructions that, when used by one or more computing devices, cause the one or more computing devices to perform operations to facilitate identification of security policies for documents, the operations comprising:
    identifying a set of content features associated with a document;
    using a security policy prediction model comprising a hierarchy of linear classifiers and the set of content features to identify a security policy comprising a set of user groups and corresponding permission settings relevant to the document, wherein each leaf node of the hierarchy is associated with a subset of policy labels that represent corresponding user group-permission tuples and form a corresponding one of the security policies and wherein generating the security policy prediction model comprises selecting the first set of content features as a set of most informative features based on a threshold information gain being exceeded, wherein the threshold information gain is a function of the user-group permission tuples and quantifies a relevance of a given content feature of the first set of content features to all of the security policies, by:
        traversing the hierarchy with the document to identify a leaf node of the hierarchy associated with the security policy based on passing the document through the hierarchy of linear classifiers to arrive at the leaf node associated with the security policy; and
        identifying the security policy from the security policies based on identifying the leaf node for the document; and
    providing the set of user groups and corresponding permission settings as a suggestion for the security policy for the document.

14. The one or more non-transitory computer storage media of claim 13, wherein the document comprises a new document created by a user without a previously assigned security policy.

15. The one or more non-transitory computer storage media of claim 13, wherein the document comprises an existing document having a previously assigned security policy with a first set of user groups and corresponding permission settings.

16. The one or more non-transitory computer storage media of claim 15, the operations further comprising comparing the set of user groups and corresponding permission settings of the identified security policy with the first set of user groups and corresponding permission settings of the previously assigned security policy and, based on the comparison, providing a suggestion to modify the previously assigned security policy.

17. The one or more non-transitory computer storage media of claim 13, wherein each of the linear classifiers is configured to partition the feature space into positive and negative partitions.

18. The one or more non-transitory computer storage media of claim 13, wherein the hierarchy of linear classifiers is configured to recursively partition the feature space in accordance with optimization of a ranking loss function that rewards correct predictions and penalizes incorrect predictions.

* * * * *